US007917536B2

(12) United States Patent
Lora et al.

(10) Patent No.: US 7,917,536 B2
(45) Date of Patent: Mar. 29, 2011

(54) SYSTEMS, METHODS AND COMPUTER PROGRAM PRODUCTS FOR MANAGING A PLURALITY OF REMOTELY LOCATED DATA STORAGE SYSTEMS

(75) Inventors: Brian Lora, Raleigh, NC (US); Frank Brick, Chapel Hill, NC (US); Steven Horan, Cary, NC (US); Randy Whitehead, Cary, NC (US); Steve Siegel, Cary, NC (US); Dan Lewis, The Woodlands, TX (US)

(73) Assignee: International Business Machines Corporation, Armonk, NY (US)

( * ) Notice: Subject to any disclaimer, the term of this patent is extended or adjusted under 35 U.S.C. 154(b) by 2003 days.

(21) Appl. No.: 10/784,605

(22) Filed: Feb. 23, 2004

(65) Prior Publication Data

US 2005/0187940 A1    Aug. 25, 2005

(51) Int. Cl.
*G06F 7/00* (2006.01)
*G06F 17/30* (2006.01)
(52) U.S. Cl. ........ 707/802; 707/640; 707/661; 707/688; 707/758; 707/791
(58) Field of Classification Search ............... 707/10, 707/3, 100
See application file for complete search history.

(56) References Cited

U.S. PATENT DOCUMENTS

| | | | |
|---|---|---|---|
| 6,477,434 B1* | 11/2002 | Wewalaarachchi et al. ..... 700/83 |
| 6,594,775 B1* | 7/2003 | Fair ................... 714/4 |
| 6,724,887 B1* | 4/2004 | Eilbacher et al. ........ 379/265.03 |
| 6,738,757 B1* | 5/2004 | Wynne et al. ................... 707/3 |
| 6,782,087 B1* | 8/2004 | Atkinson et al. ......... 379/210.01 |
| 7,228,306 B1* | 6/2007 | Altman et al. ................ 1/1 |
| 2002/0078382 A1* | 6/2002 | Sheikh et al. ................ 713/201 |
| 2002/0129048 A1* | 9/2002 | Qiu et al. ...................... 707/204 |
| 2002/0135801 A1* | 9/2002 | Tessman et al. ............. 358/1.15 |
| 2002/0198984 A1* | 12/2002 | Goldstein et al. ............ 709/224 |
| 2003/0115266 A1* | 6/2003 | Sweet et al. .................. 709/203 |
| 2003/0120593 A1* | 6/2003 | Bansal et al. ................. 705/39 |
| 2003/0135823 A1* | 7/2003 | Marejka et al. ............... 715/511 |
| 2003/0216889 A1* | 11/2003 | Marko et al. ................. 702/182 |
| 2004/0054680 A1* | 3/2004 | Kelley et al. ................. 707/100 |
| 2004/0102925 A1* | 5/2004 | Giffords ...................... 702/182 |
| 2004/0218750 A1* | 11/2004 | Atkinson et al. ......... 379/265.03 |
| 2004/0230691 A1* | 11/2004 | Wookey ........................ 709/230 |
| 2004/0260736 A1* | 12/2004 | Kern et al. ................... 707/204 |

OTHER PUBLICATIONS

International Search Report and The Written Opinion of the International Searching Authority, corresponding to International Application No. PCT/US2005/05032, mailed Oct. 27, 2006.

* cited by examiner

*Primary Examiner* — Usmaan Saeed
(74) *Attorney, Agent, or Firm* — Arthur J. Samodovitz

(57) ABSTRACT

A data storage management system for managing a plurality of remotely located, independent data storage systems includes a central monitoring system and a plurality of agent systems, each in communication with a respective remotely located customer data storage system. Each remote agent system collects data from a respective customer data storage system that relates to the performance/status of the data storage system. Each agent system converts the collected data to a standardized format and then stores the collected data at the central monitoring system. The central monitoring system continuously and automatically monitors activities at the remote data storage systems and, using pattern recognition and data correlation techniques, can predict when system faults are developing at these remote data storage systems. Data storage management experts staffing the command center can initiate corrective action before a customer's data is adversely impacted.

38 Claims, 6 Drawing Sheets nikebk|nikebk_1069038557|39669|0|Alliente_MFNVNA01a_COL_S08_FIL_0_ 1|0|weekly_full|0|3|Nov 16 22:09:17 2003|Dec 17 22:09:17 2003|2109|6942943|129472|0|000ZYV 00192T|2 3|10.41.3.100|CATI

| CODE | MESSAGE EXPLANATION |
|---|---|
| 0 | THE REQUESTED OPERATION WAS SUCCESSFULLY COMPLETED<br>THERE WERE NO PROBLEMS DETECTED WITH THE REQUESTED OPERATION. |
| 1 | THE REQUESTED OPERATION WAS PARTIALLY SUCCESSFULL<br>A PROBLEM THAT MAY REQUIRE CORRECTIVE ACTION WAS DETECTED DURING<br>THE REQUESTED OPERATION. |
| 2 | NONE OF THE REQUESTED FILES WERE BACKED UP<br>A BACKUP OR ARCHIVE COULD NOT BACK UP ANY OF THE FILES IN THE FILE LIST. |
| 3 | VALID ARCHIVE IMAGE PRODUCED, BUT NO FILES DELETED DUE TO NON-FATAL PROBLEMS<br>THE BACKUP PORTION OF THE ARCHIVE COMMAND<br>REPORTED PROBLEMS SO THE FILES WERE NOT DELETED. |
| 4 | ARCHIVE FILE REMOVAL FAILED<br>THE BACKUP PORTION OF THE ARCHIVE COMPLETED WAS<br>SUCCESSFUL BUT THE DELETE FAILED. |
| 5 | THE RESTORE FAILED TO RECOVER THE REQUESTED FILES<br>THERE WERE ERRORS THAT CAUSED THE RESTORE TO FAIL. |
| 6 | THE BACK UP FAILED TO BACK UP THE REQUESTED FILES<br>ERRORS CAUSED THE USER BACKUP TO FAIL. |
| 0000 | NO ADDITIONAL SENSE INFORMATION |
| 0401 | LOGICAL UNIT IN PROCESS OF BECOMING READY |
| 0402 | LOGICAL UNIT NOT READY, INITALIZING COMMAND REQUIRED |
| 0404 | LOGICAL UNIT NOT READY, FORMAT IN PROGRESS |
| 0481 | FIRMWARE VERSIONS INCOMPATIBLE |
| 0C00 | UNRECOVERABLE WRITE ERROR |
| 0C01 | WRITE ERROR RECOVERED WITH AUTO REALLOCATION |
| 0C80 | UNRECOVERED WRITE ERROR DUE TO POSSIBLE BATTERY DISCHARGE AND ALTERNATE CONTROLLER FAILURE |
| 0C81 | DEFERRED UNRECOVERABLE ERROR DUE TO MEMORY FAILURE |
| 1100 | UNRECOVERED READ ERROR |
| 118A | MISCORRECTED DATA ERROR - DUE TO FAILED DRIVE READ |
| 1802 | RECOVERED DATA - DATA AUTO REALLOCATED |
| 1A00 | PARAMETER LIST LENGTH ERROR |
| 2000 | INVALID COMMAND OPERATION CODE |
| 2100 | LOGICAL BLOCK ADDRESS OUT OF RANGE |
| 2400 | INVALID FIELD IN CDB |
| 2500 | LOGICAL UNIT NOT SUPPORTED |
| 2600 | INVALID FIELD IN PARAMETER LIST |
| 2800 | NOT READY TO READY TRANSITION |
| 2900 | POWER ON, RESET, OR BUS DEVICE RESET OCCURRED |
| 2904 | DEVICE INTERNAL RESET |
| 2981 | DEFAULT CONFIGURATION HAS BEEN CREATED |
| 2982 | CONTROLLER FIRMWARE SYNCHRONIZED |
| 2A01 | MODE PARAMETERS CHANGED |
| 2A02 | LOG PARAMETERS CHANGED |
| 2F00 | COMMANDS CLEARED BY ANOTHER INITIATOR |
| 3101 | FORMAT COMMAND FAILED |
| 3200 | OUT OF ALTERNATES |
| 3F01 | DRIVE MICROCODE CHANGED |
| 3F80 | DRIVE FAILED DUE TO WRITE FAILURE |

FIG. 7

SYSTEMS, METHODS AND COMPUTER PROGRAM PRODUCTS FOR MANAGING A PLURALITY OF REMOTELY LOCATED DATA STORAGE SYSTEMS

FIELD OF THE INVENTION

The present invention relates generally to data storage and, more particularly, to management of data storage systems.

BACKGROUND OF THE INVENTION

The evolution of information technology into the central nervous system of the modern enterprise has dramatically changed the amount of digital information generated and stored by today's business ventures. Personal productivity applications such as spreadsheets, word processors, presentation software, and personal database programs have driven personal computers (PCs) to include gigabytes of storage. E-mail has become a core business communication tool and the worldwide e-mailbox count is estimated to exceed one billion. Both e-mail volume and e-mail attachment size and volume have increased dramatically. At the same time department and workgroup collaborative applications combined with Web and customer-facing have resulted in the generation of terabytes of data. The full impact of multimedia digitization of books, audio, and video is yet to be realized.

As a result, the mission critical nature of an enterprise's digital information has increased. Data is now viewed as the life blood of the enterprise since any disruption in electronic data flow can destroy an enterprise's ability to function. Current industry estimates suggest an enterprise that experiences a disruption in data access lasting more than 10 days may never fully recover financially, and that 50% of those may be out of business within 5 years. Therefore, data storage is now viewed as a critical business function and maintaining its availability, integrity, and security is a matter of survival for enterprises today.

This new position of electronic data as a core mission critical asset is creating new challenges in information and data storage management. New innovations in storage management have enabled the replacement of traditional direct-attached storage systems with centralized storage networks. In a centralized storage network environment, documents and other data are stored in a central file system owned, controlled, or directly managed by the enterprise, or by a contracted outsourcing organization. A storage management system is accessed via a private network such as a local area network (LAN) or a restricted subset of public network technology such as an Intranet or a virtual private network (VPN). Typical enterprise storage management systems provide techniques to index documents by document categories and keywords, plain-language names, document numbers and/or entered attributes. Index based searching capabilities are typically provided, also.

Centralized storage networks can allow storage devices to be decoupled from specific hardware and managed as a centralized resource pool. Virtually any server can have access to any and all of the storage capacity, allowing available storage to be allocated to the point of need. Both scalability and flexibility are increased, and growing needs for storage can be met by adding more capacity to a storage pool instead of individual point servers.

However, while data storage networks are enabling improved efficiencies and scalabilities of storage hardware, the complexities of managing storage networks has increased dramatically. Problems that arise can be extremely complex and difficult to solve, and typically requires an enterprise to have access to highly skilled and specialized technicians. As a result, data storage system administration can represent a substantial portion of an enterprise's information technology (IT) budget. Moreover, data storage system problems and disruptions may severely impact business continuity.

As a result, many enterprises are viewing data storage management skills as a required core competency. However, they are finding it difficult and expensive to train, maintain, and retain in-house expertise. The infrequency of problems within any one firm makes it difficult for one firm to maintain freshness in the problem resolution skills of an internally captive staff. Reducing costs by assigning these individuals to other tasks further dilutes skill focus and can cause employee retention problems. The particular selection of vendor tools and products made by any one firm may also limit internal staffing exposure to new and emerging trends.

Vendors in the data storage management industry are pursuing proprietary approaches as a competitive tool to lock customers into vendor products. There currently are no fully integrated tools that take a multi-vendor and system wide perspective. Firms currently use a variety of multi-vendor tools and techniques to manage and troubleshoot their data storage systems. Unfortunately, this can add cost and complexity to data storage management. Accordingly, there is a need for improved, lower cost ways of managing data storage management systems.

In recent years, Internet-enabled file storage providers have begun to provide remote file storage for businesses or individuals that cannot afford enterprise data management solutions. At best, these companies take the functionality of personal computer file systems, such as Microsoft's Windows Explorer, to the Internet. Their focus is on the individual consumer and small project teams with no consideration of an organization's need to securely manage large volumes or information in customized manners. As data are transmitted over a public data network (e.g., the Internet), security of the data can be compromised. The data can be intercepted, read, or tampered with in such a manner as to reduce the value of the data. Data residing on hosted Internet-provided file storage systems can be compromised by unauthorized access to that data by personnel nominally responsible for only managing and maintaining the storage of the data.

Accordingly, there is a need for secure data storage management that is more affordable for small and medium-sized enterprises.

SUMMARY OF THE INVENTION

In view of the above, a data storage management system for managing a plurality of remotely located, independent data storage systems is provided. A central monitoring system, located in a different geographical location from the remote data storage systems, is configured to communicate with a plurality of agent systems, each in communication with a respective remotely located customer data storage system. Each remote agent system collects data (e.g., metadata) from a respective customer data storage system that relates to the performance/status of the data storage system. Each agent system converts the collected data to a standardized format and then stores the collected data in a data repository at the central monitoring system. The central monitoring system continuously and automatically monitors activities at the remote data storage systems and, using pattern recognition and data correlation techniques, can predict when system faults are developing at these remote data storage systems.

Data storage management experts staffing the command center can initiate corrective action before a customer's data is adversely impacted.

According to embodiments of the present invention, the central monitoring system may be configured to communicate corrective action information automatically to each respective remote agent system and each remote agent system may be configured to implement the corrective action in response thereto.

According to embodiments of the present invention, a remote agent system may include pattern recognition logic that can identify data patterns that precede fault conditions at a respective remotely located data storage system. A remote agent system may also include action logic that directs the remote agent system to perform one or more corrective actions at a respective remotely located data storage system in response to identifying a data pattern known to precede a fault condition.

A data storage management system, according to embodiments of the present invention, further includes a plurality of customer portals, each of which is associated with a respective one of the remotely located data storage systems and with the central monitoring system. A customer portal provides customer access to information about the customer's data storage system. Each customer portal also allows for customer control and configuration of the customer's data storage system. Customers are able to access information regarding the status of their data storage systems through individually customized web portals which present the appearance of a virtual private management system.

Embodiments of the present invention can alleviate the need for captive in-house data storage management expertise, and can expand the market reach of storage network technologies to smaller firms. Embodiments of the present invention allow multiple independent customers to efficiently utilize the knowledge, skills, and services of a shared pool of data storage experts without relinquishing control of their data systems. The application of these techniques can result in a higher quality of service and lower management cost.

BRIEF DESCRIPTION OF THE DRAWINGS

FIG. 7 is table containing a non-exhaustive list of system faults at a customer data storage system.

DETAILED DESCRIPTION OF THE INVENTION

Figure 1:
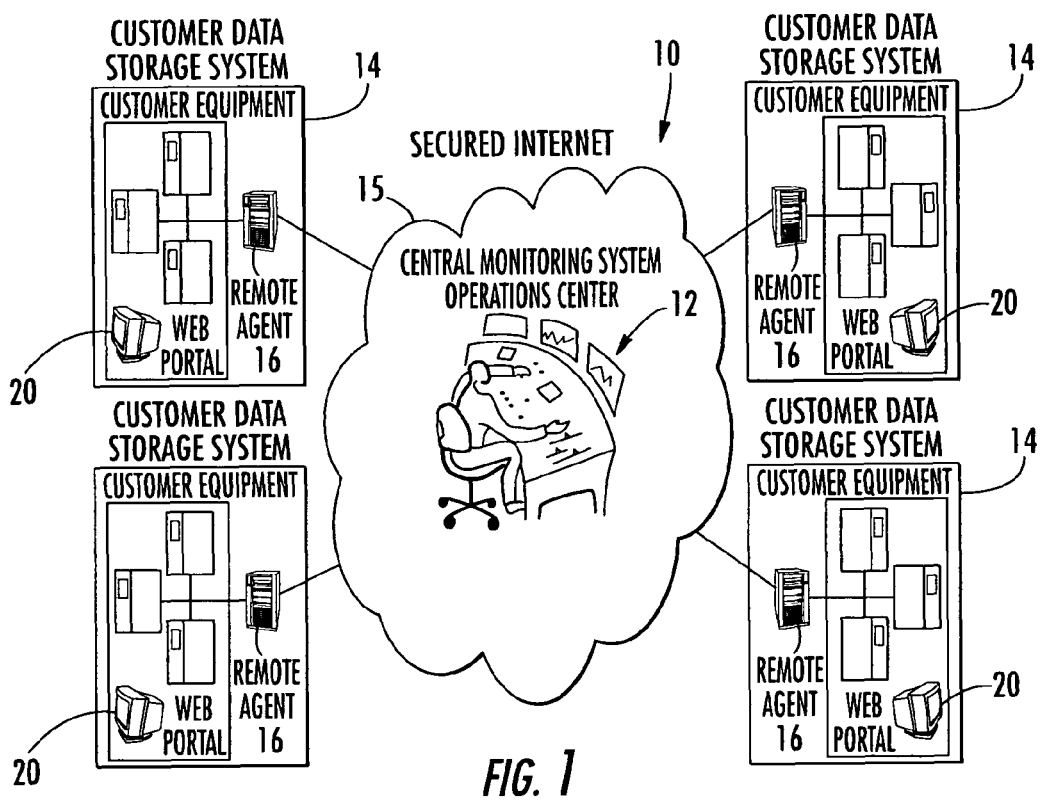
FIG. 1 is a block diagram that illustrates a data storage management system for managing a plurality of remotely located, independent customer data storage systems, according to embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The terms "remotely located data storage system", "remote data storage system", "storage system", "customer data storage system", "customer site" are interchangeable and, as used herein, refer to any customer site where data is stored electronically, in stand-alone data storage devices, networked or otherwise connected data storage devices, any intelligent device in any static or mobile location, including but not limited to, corporate offices, internet data centers, distributed systems, centralized systems, branch offices, mobile users, enterprise locations, consumers, etc.

The terms "data storage management" and "storage management" are interchangeable and, as used herein, refer to any type of data storage service including, but not limited to, data backup and recovery, primary data storage, data archiving, business continuity and disaster recovery, and remote data storage management.

The term "agent", as used herein, refers to an Internet-based program (or programs) that gathers information and/or performs some service, typically according to a schedule and without requiring a user's presence.

The terms "remote agent" and "remote agent system", as used herein, are interchangeable.

As used herein, the term "and/or" includes any and all combinations of one or more of the associated listed items.

The present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. However, software embodiments of the present invention do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

The present invention is described below with reference to block diagram and flowchart illustrations of methods, apparatus (systems) and computer program products according to embodiments of the invention. It will be understood that each block of the block diagrams and/or flowchart illustrations, and combinations of blocks, can be implemented by computer program instructions and/or hardware operations. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

It should be noted that, in some alternative embodiments of the present invention, the functions noted in the blocks may occur out of the order noted in the figures. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Referring initially to FIG. 1, a data storage management system 10 for managing a plurality of remotely located customer data storage systems, according to embodiments of the present invention, is illustrated. The data storage management system 10 includes a central monitoring system 12 that is in communication with a plurality of remotely located data storage systems 14 at respective customer locations via a communications network 15, such as the Internet. The central monitoring system 12 is located at a geographical location that is different from the geographical locations of the customer data storage systems 14. A remote agent system 16 is located at each customer data storage system 14 and with the central monitoring system 12 via the communications network 15. Each remote agent system 16 is configured to collect data from a respective data storage system 14, convert the collected data to a standardized format, consolidate the standardized format data and store the collected data in a central data repository (e.g., a database) associated with the central monitoring system 12.

The illustrated data storage management system 10 also includes a plurality of customer portals 20. Each customer portal 20 is associated with a respective one of the customer data storage systems 14 and with the central monitoring system 12. Each customer portal 20 provides customer access to information about the customer's data storage system 14, and allows customer control and configuration of the data storage system 14. According to embodiments of the present invention, each customer portal 20 provides users with web-based access to system performance information and status, and can be used to request services and make system changes. Customized to the desires and needs of each individual customer, the data storage management system 10 appears to the customer, via a respective customer portal 20, as a dedicated private storage management service.

The illustrated data storage management system 10 allows multiple independent customers to efficiently utilize the knowledge, skills, and services of a shared pool of data storage experts without relinquishing control of their respective data storage systems. Embodiments of the present invention can result in higher quality of service and lower management costs than any one customer could achieve on their own.

The illustrated data storage management system 10 utilizes a combination of distributed intelligent networks, human expertise, and automated systems to manage multiple third party data storage systems. A central staff of storage specialists at the central monitoring system 12 monitor data feeds and system status information originating from the various remote data storage systems 14. When system faults occur, the central staff initiates corrective action to clear the faults and maintain systems operations. In addition, the information collected from the various data storage systems is analyzed for recognizable patterns that precede and can indicate developing fault situations at the remote data storage systems 14. These patterns are then programmed into the data storage management system 10 to trigger predictive alarms that enable the central staff to take preemptive measures necessary to avoid disruptions in service. Customers can access information regarding their specific data storage systems 14 and request changes and services through a respective customer portal 20 that utilizes an individually customized interface and appearance of a dedicated management system.

According to embodiments of the present invention, distributed intelligence is utilized to overcome limitations in flexibility associated with shared infrastructure while reducing system risks. Each remote agent system 16 provides a single point of contact for the collection and consolidation of information available from multiple systems and data sources at a respective customer data storage system 14. This information is then translated into a common data format used by the central monitoring system 12. Providing a layer of abstraction and isolation between the central monitoring system 12 and site specific equipment configuration, this allows each remote agent system to be customized to the needs, desires, and system configuration of each particular customer. This level of isolation serves to reduce risks as component, software, or configuration changes at any one customer site are isolated and have minimal impact on the operation of the overall service.

Each remote agent system 16 may also be configured to apply intelligent pattern recognition and data filtering algorithms to assure that only relevant information is sent to the central monitoring system 12. This can reduce the data load on staff at the central monitoring system 12, thereby expanding the number of remote data storage systems 14 that can be supported by a given level of resources.

Remote Agent Systems

The sources for performance and operational information at any one customer data storage system may be numerous and may be in a constant state of flux. Data storage devices at a customer site 14 may include, but are not limited to: individual drives; cabinet controller boards; network communication switches; host bus adaptors; routers; patch panels; power sources; server hardware; operating systems; and application software. Information (i.e., metadata) from data storage devices at a customer site 14 may be "in band" (i.e., the management control path follows the same path as the data path) and "out of band" (i.e., the management control path is separated from the data path) and may include, but are not limited to: internal ASCII data logs, SNMP available management information base (MIB) instrumentation, configuration data available from console ports, device and application instrumentation, and software API (application programming interface) accessible status. As known to those skilled in the art, a MIB creates a metadata definition to translate machine conditions to a text-readable format. Each of these components may be from a different vendor. As such, troubleshooting these systems via conventional methods can be highly complex and labor intensive, requiring a skilled and knowledgeable technician with physical access to the various pieces of equipment. The technician conventionally is required to manually access and extract the information and make informed judgment calls as to the root cause of identified problems, and what information to retrieve.

Of the various conventional data storage management tools on the market today, no one management tool collects and analyzes all of the above information. For example network management tools will only collect SNMP data, while other tools are monolithic in structure and focus only on a single function such as back-up management. No single conventional tool takes an overall system approach as does the present invention.

Each remote agent system 16, according to embodiments of the present invention, provides a single point of contact for multiple independent information sources at a customer site, thereby eliminating the need for a technician to manually collect information from the various devices. Each remote agent system 16 includes application software, operating system(s), and a dedicated hardware (e.g., personal computer) platform bundled into a secure dedicated subsystem. Each remote agent system 16 is located in close proximity to a customer's data storage system 14 and may use a variety of communication techniques to automatically collect and pre-processes status and operational information from the various components of the customer's data storage system 14.

Based upon configured policies, scripts, and current status of the environment, this information is consolidated, filtered, converted into a standardized format, and then automatically reported to the central monitoring system 12 by a remote agent system 16 using secure communications technologies (e.g., secured sockets layer, etc.). These policies and scripts embody a level of intelligent decision making allowing the filtering and formatting processes to be dynamic and dependent upon the recent system events and current system status. This intelligent dynamic processing serves to assure only appropriate and desired information about activities, performance and system health is communicated to the central monitoring system 12, thereby optimizing bandwidth utilization while minimizing processing load at the central monitoring system 12. This reduction in data load serves to expand overall system scalability and efficiency.

The capability of each remote agent system 16 to intelligently determine which information needs to be filtered allows for automatic and dynamic adjustment of data reporting based on current status and events. The algorithms contained in these scripts, policies, and processing software may continually evolve over time based on the collective experience and knowledge gained from managing numerous heterogeneous data storage systems across diverse environments.

According to one embodiment of the present invention, each remote agent system 16 is implemented as data collections software resident on a secured unattended processing platform located near and connected to the storage equipment of a customer site being managed. This software may be in addition to third party functional software such as tape back-up software, etc.

Figure 2:
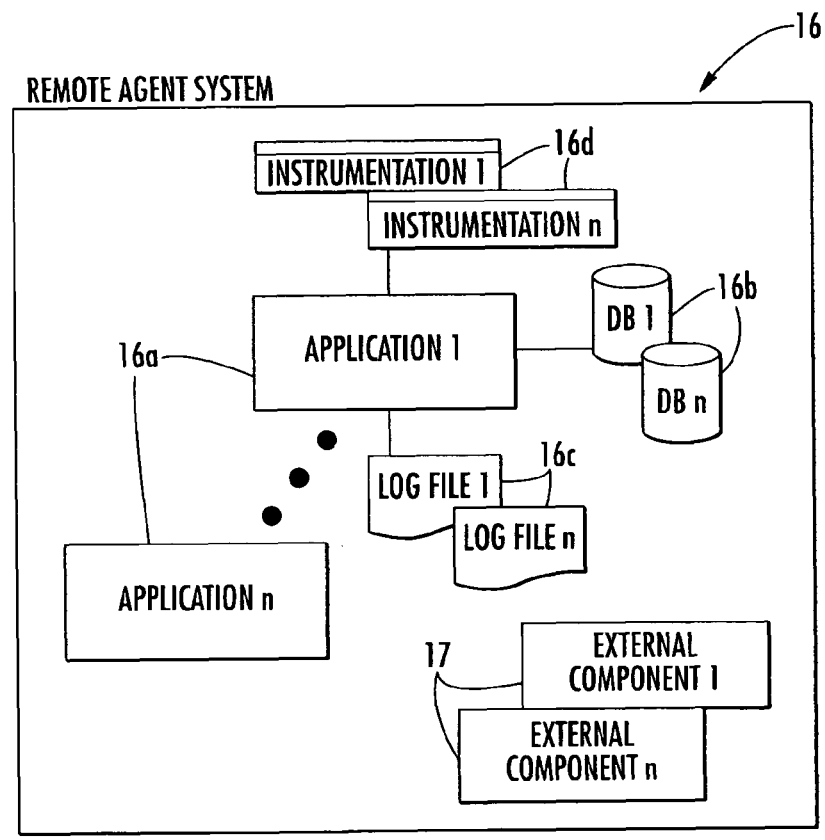
FIG. 2 is a block diagram that illustrates a remote agent system utilized by the data storage management system of FIG. 1, according to embodiments of the present invention.

FIG. 2 illustrates exemplary components of a remote agent system 16, according to embodiments of the present invention. Each remote agent system 16 may include one to "n" applications 16a, each with its own one to "n" database 16b, one to "n" log file 16c, and one to "n" instrumentation file 16d, such as configuration, status, or SNMP MIB. In addition, there may applications located on devices 17 external to the remote agent system 16, but reachable through networks and other communication connections. These external devices 17 may be from multiple independent vendors, may use proprietary data formats, and may be incompatible with each other in that they do not interact but provide stand alone functionality. Each remote agent system 16, according to embodiments of the present invention, can collect, consolidate, and assimilate meaningful content from all of the types of information sources illustrated in FIG. 2.

Figure 3:
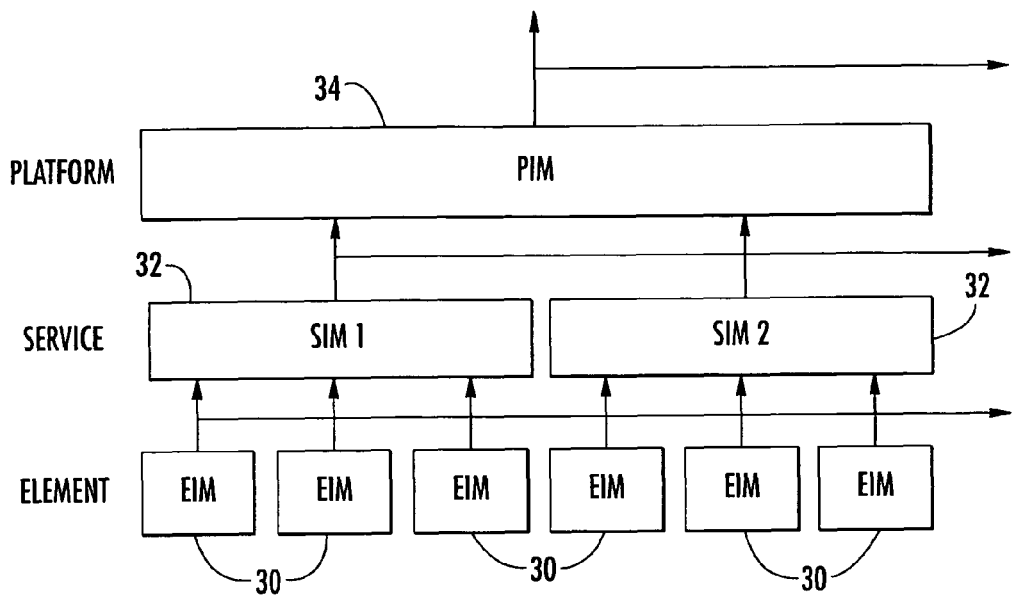
FIG. 3 is a block diagram that illustrates the hierarchical relationship of information managers, according to embodiments of the present invention.
Figure 4:
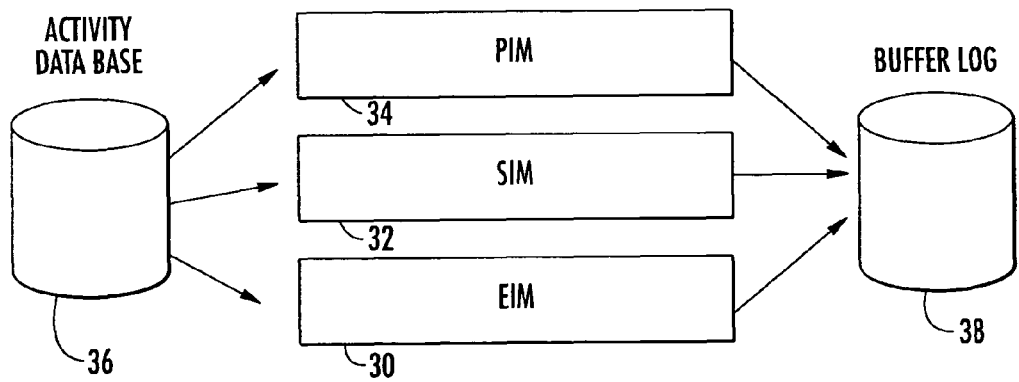
FIG. 4 is a block diagram that illustrates communications between information managers and an activity director, according to embodiments of the present invention.

According to embodiments of the present invention, each remote agent system 16 utilizes a flexible, multi-tier architecture to provide multiple points of data consolidation and abstraction from proprietary data formats. As illustrated in FIGS. 3-4, each remote agent system 16 includes one or more element information managers (EIMs) 30, one or more service information managers (SIMs) 32, one or more platform information manager (PIMs) 34, and an activity director 36 that is configured to communicate with each EIM 30, SIM 32 and PIM 34 and to instruct each EIM 30, SIM 32 and PIM 34 as to what information to collect and store.

According to embodiments of the present invention, each EIM 30 is configured to communicate with a respective data source at a remotely located data storage system and to identify, filter and convert storage metadata from the data source to a standardized format. For example, one EIM 30 may be configured to communicate with and extract data from Veritas® Log File version 6 while another EIM 30 may be configured for the Veritas® Tape Catalog file version 6. As known to those skilled in the art, metadata is a definition or description of data. Thus, according to embodiments of the present invention, a remote agent system 16 obtains, converts and sends to a central monitoring system 12, data that describes the condition or state of actual data stored at a remotely located data storage system. The EIM's 30 are created and configured for specialized interaction within various useful system elements. For example, one EIM may integrate with a single aspect of a broader backup and restore platform for purposes of gathering metadata on all system aspects, another may interact to gather metadata associated with transactional events, thru another EIM, configuration settings and yet another EIM, media management.

Each SIM 32 is configured to communicate with EIMs 30 associated with common data applications. For example a SIM 32 associated with Veritas® applications would communicate with and manage EIMs 30 for all Veritas® application data components at a particular customer site 14.

Each PIM 34 is configured to communicate with and handle SIMs 32 associated with a common data application platform (e.g., Veritas® NetBackup, Avamar, etc.). Separate information managers are written for each information source at a customer site 14. This layered approach allows for minimal system impact and required code changes should any one element of a customer's data storage system change.

An activity director 36 (e.g., a database) is configured to communicate with each EIM 30, SIM 32 and PIM 34 and to instruct each EIM 30, SIM 32 and PIM 34 as to what information to collect and store. Each information manager (EIM, SIM, PIM) creates a standardized output which contains a different level of summation and detail. The data logging activity from individual modules and levels is parameter driven by information contained in an activity director 36. Modules are entities acting as aggregating points for the various levels of information managers. Levels correspond to the hierarchy of depth and type of information needed. Input and output is controlled thru the activity director as a means for coordinating and correlating pertinent information. Each individual module reads information contained in this file to determine what action it should take in regards to collecting and writing of information to a buffer log file 38. The level of detail collected and logged is therefore dynamically controlled by how the parameters in the activity director 36 are configured.

According to embodiments of the present invention, a remote agent system 16 may also include pattern recognition logic as well as the control for what information is sent to the central monitoring system 12. When predetermined patterns are detected, a programmed course of action is initiated. This could include anything from the generation of an alarm to dynamic changes in the reporting and recording of details at a customer site 14.

According to embodiments of the present invention, a remote agent system 16 may contain command modules for each application and device being monitored by the data storage management system 10. Command modules are capable of accepting commands issued electronically from the central monitoring system 12, and delivering those commands to the appropriate piece of equipment at a customer's data storage system.

Figures 5, 6:
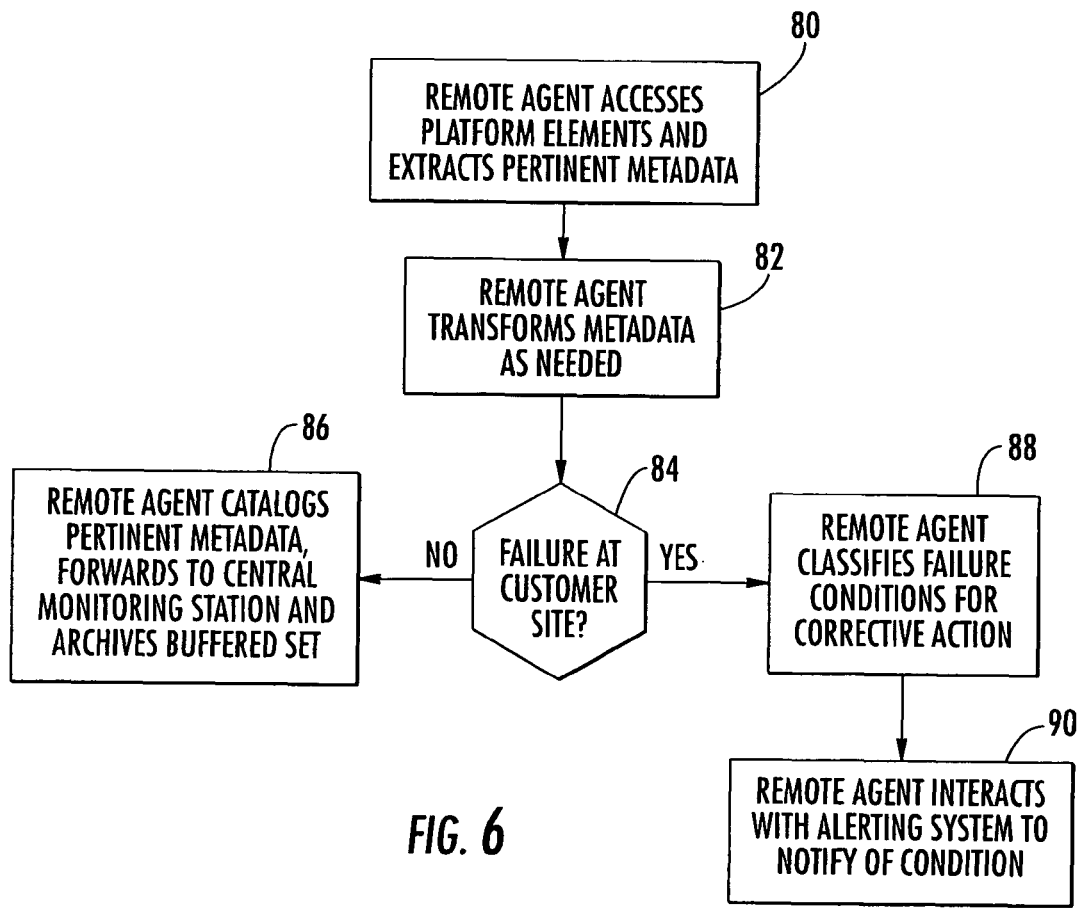
FIG. 5 illustrates the conversion of data into a standard format by a remote agent system, according to embodiments of the present invention.
FIG. 6 is a block diagram that illustrates operations performed by a remote agent system, according to embodiments of the present invention.

FIG. 5 illustrates an exemplary standard format into which data from a customer site has been converted into, according to embodiments of the present invention.

FIG. 6 illustrates how a remote agent system 16 converts data into a standardized format and filters data, according to embodiments of the present invention. A remote agent system 16 accesses platform elements at a customer site and extracts pertinent metadata (Block 80). The remote agent system 16 transforms the extracted metadata as necessary (Block 82). If operations at a customer site are determined to be successful (Block 84), the remote agent system 16 catalogs pertinent metadata, forwards to the central monitoring system 12 and archives a buffered set of metadata (Block 86). If operations at a customer site are determined not to be successful (Block 84), the remote agent system 16 classifies the failure conditions at the customer site for corrective action (Block 88) and interacts with an alerting system to make failure conditions known (Block 90).

According to embodiments of the present invention, a remote agent system 16 functions to capture, transform, correlate and filter metadata. The individual element managers interact with systems information to extract metadata. That metadata is then transformed based on pre-defined algorithms. Condition-based pattern matching is employed to correlate metadata structures between various EIMs. Next, any extraneous metadata is filtered from the metadata stream.

Central Monitoring System

A central monitoring system 12, according to embodiments of the present invention, receives and processes data received from each remote agent system 16. Depending on the type of data received, the information is either logged into an appropriate database or, in the case of an identified system fault at a customer site 14, converted to an alert. System faults at a customer data storage system 14 may include hardware problems, component problems, device level problems, application problems, and networking issues, and can span the full range of all systems that encompass service delivery. For any new services, development and integration are performed at both the EIM level and System Fault level. System Faults are aggregated, correlated and filtered to provide unique, actionable support issues. These actionable faults are logged, displayed in human-readable presentation formats and automatically integrated in an automated ticketing system. Once these faults are in the automated ticketing system, they are classified according to priority, customer, location, level of support personnel, and required resolution path. There are over 15,000 unique system faults that are integrated into this system. FIG. 7 sets forth a non-exhaustive list of possible system faults at a customer site 14.

According to embodiments of the present invention, when a system fault occurs, alerts are immediately communicated to the central monitoring system 12 where a specialist can review and take action, if necessary. Communication can be any combination of e-mail, display, printed log, pager or other means known to those skilled in the art. The monitoring specialist may respond to an event by requesting additional information required, and initiating appropriate intervention measures. The central monitoring system 12 monitors when each event is reported, when each event is acknowledged by a specialist, what action is initiated, and when the fault was closed (e.g., when a fault condition is rectified at a customer site 14).

According to embodiments of the present invention, the central monitoring system 12 may use historical trend and configuration data to go beyond identification of current system faults by using pattern recognition and artificial intelligence to identify emerging problems at a customer site 14. This allows a system specialist to proactively initiate preventative measures. Utilizing mediation, configuration, policy, and historical databases, inbound data is processed to identify patterns of activities and events that are known to indicate developing system issues. These databases act as a logical metadata storage repository for the on-going input of remote agent metadata. The metadata repository is a consolidation point acting across multiple technologies (i.e., types of remote agents) and geographic locations. As metadata is loaded into this repository, there is an archiving effect supporting the multi-generational history of metadata, across service technologies and physical locations. This allows root causes to be quickly isolated and resolved before system performance problems can impact business operations of a customer. Pattern recognition algorithms and identified patterns are constantly being refined and revised to reflect new equipment, configurations, and experience gained from the ongoing management of a population of diverse remote storage system configurations.

The present invention is advantageous because the central monitoring system 12 allows for a small number of specialists to easily manage a large number of customer data storage systems 14. Whenever intervention is required, a specialist at the central monitoring system 12 is alerted to initiate appropriate interventions. The course of action may range from automatic correction, to dispatching instructions to an on-site technician at a customer's data storage system 14, or a simple notification to the customer's own internal support staff. The selected course of action may be policy based and driven by the individual desires and agreement with each customer.

The central monitoring system 12 can be utilized to provide a quality assurance monitoring when hands-on intervention is required at a customer site to change a cable, replace a board, or manually adjust or replace some other piece of equipment. While a variety of techniques may be employed, they can be combined to allow a less skilled third party provide the required service without clouding the issues of overall responsibility or liability for system performance. According to embodiments of the present invention, the central monitoring system 12 automatically issues an activity dispatch when intervention is required, and closes the ticket when action is verified to have been completed. During this activity window, a customer's data storage system is monitored for the expected patterns of messages and alerts as the required work is performed.

According to embodiments of the present invention, additional levels of supervision can be employed through the use of real time audio and video monitoring, as well as the use of step by step scripted directives issued by a specialist at the central monitoring system 12. An example would be the use of video and voice over IP to a handheld PDA equipped with a Web camera and wireless LAN card. Communication can occur over an established network infrastructure and step by step commands can be given from the central monitoring system 12. Real time audio and video feedback from the handheld PDA camera allows a specialist at the central monitoring system 12 to verify that the work is being performed correctly by a specialist at the customer's site 14.

According to embodiments of the present invention, preemptive measures can be taken by the central monitoring system in response to identifying data patterns that indicate potential problems at a customer's data storage system 14. Broad categories include hardware, software, network which are further broken down by platform and device, type of software package and topology. For example, if a system backup at a customer's data storage system 14 fails, an automated response from the central monitoring system 12 can automatically restart the backup. If the backup fails again, an error code can be assigned and transmitted by an EIM 30 and remote agent system 16 to the central monitoring system 12. The failure is then correlated and presented to a central alerting system at the central monitoring system where it classified and prioritized and is visible to human support staff, as well as automatically updated, depending on severity, to a ticketing system. If corrective action is not taken within a defined time period, the issue may be automatically escalated thru a parallel escalation scheme of technical support personnel and other contacts.

Customer Portals

Figure 8:
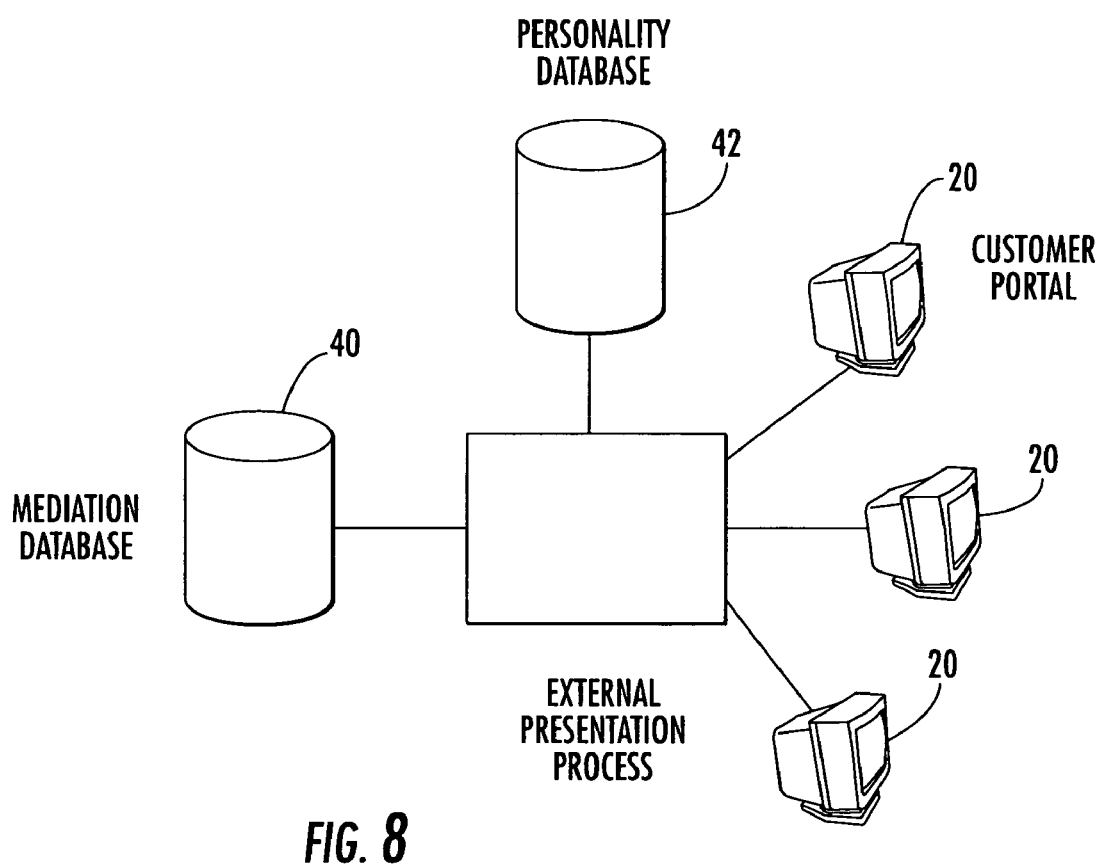
FIG. 8 is a block diagram that illustrates customer portals, according to embodiments of the present invention.

Referring to FIG. 8, each customer portal 20 provides customer access to an event mediation database 40 and a personality database 42. The event mediation database 40 contains the associated events needed for customer reporting and billing. The information viewed through a customer portal 20 is filtered and presented according to the policies defined in the personality data base 42 for the particular customer. These policies define the information presented, as well as the branding and layout of web presentation pages, or any automated data feeds to other systems. The approach allows a unique and customized presentation to be developed for each customer. Presentations supported not only include web pages but XML data feeds to other external third party or custom systems.

A customer portal 20, according to embodiments of the present invention, may also contain an n-tier reporting approach. Structured in a hierarchy based on location, customer, and channel partner, each higher layer is only able to view information relevant to their position in the hierarchy. A channel partner refers to the business relationship established in an indirect sales model whereby a service is sold indirectly to an end user thru a specialized party (i.e., a "channel partner"). According to embodiments of the present invention, individual customers can only view information relevant to their site (i.e., customers can only view information relevant to their equipment, and data storage service providers can only view information relevant to the customers they service).

According to embodiments of the present invention, a customer portal 20 contains an interface that allows a customer to request changes in service or systems, or to engage interaction and support from a data storage management specialist.

Figure 9:
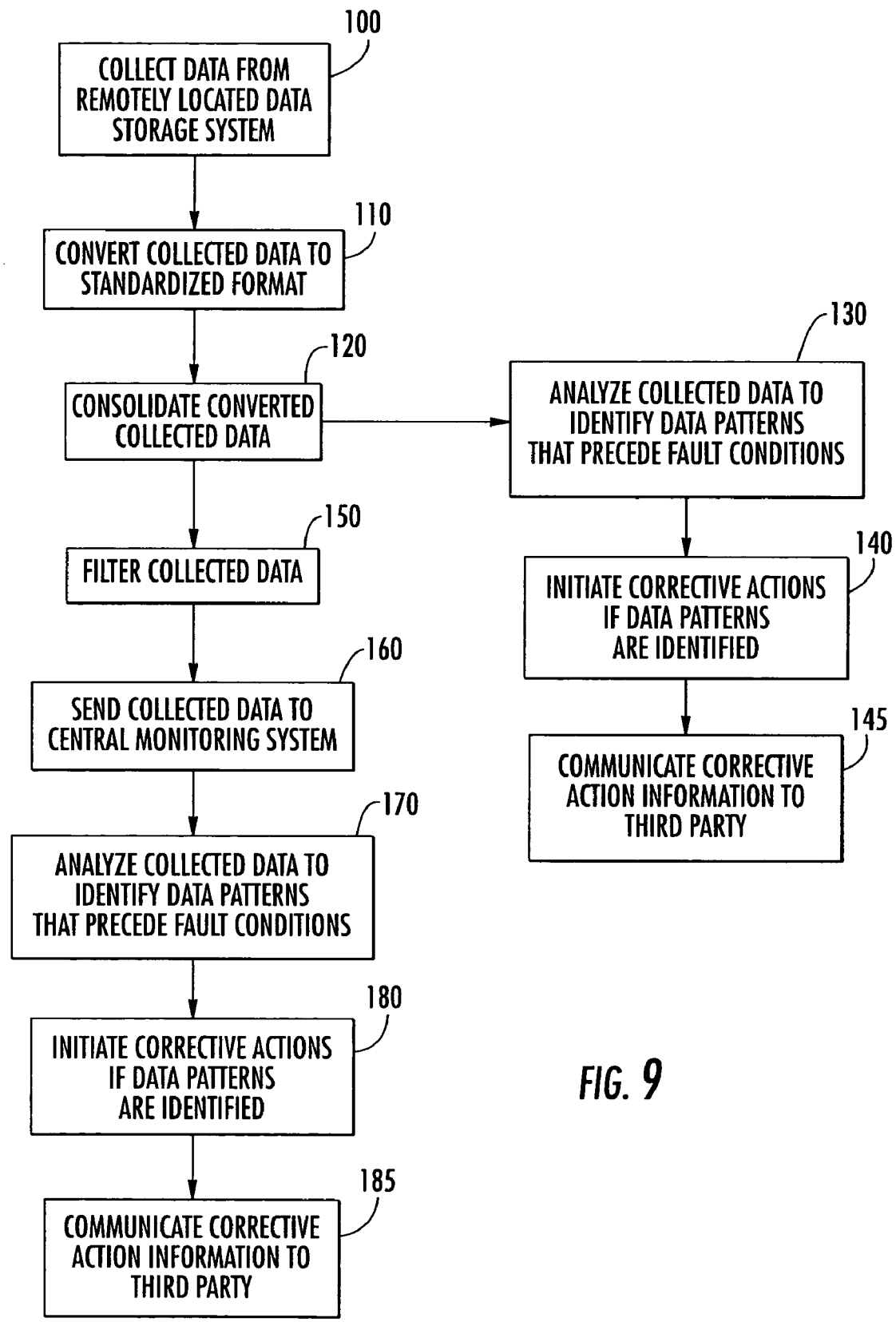
FIG. 9 is a block diagram that illustrates methods of managing remotely located customer data storage systems, according to embodiments of the present invention.

Referring to FIG. 9, a method of managing a remotely located, independent data storage system, according to embodiments of the present invention, is illustrated. A remote agent system at a remotely located data storage system collects data from a remotely located data storage system (Block 100), converts the collected data to a standardized format (Block 110), and consolidates the converted, collected data (Block 120). The remote agent system may also analyze the collected data to identify data patterns that precede fault conditions at the remotely located data storage system (Block 130) and may initiate corrective actions if any such data patterns are identified (Block 140). Corrective actions initiated by the remote agent system may include communicating corrective action information to a third party (Block 145).

The remote agent system may filter collected data to reduce the amount of collected data (Block 150). The remote agent system sends the collected data to a central monitoring system where the data is stored in a data repository (Block 160). The central monitoring system analyzes the collected data to identify data patterns that precede fault conditions at the remotely located data storage system (Block 170) and may initiate corrective actions if any such data patterns are identified (Block 180). Corrective actions initiated by the central monitoring system may include communicating corrective action information to a third party and/or to the remote agent system (Block 185).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A data storage management system for managing a plurality of remotely located, independent data storage systems, comprising:
   a central monitoring system located at a geographical location different from a geographical location of each respective remotely located, independent data storage system, wherein the central monitoring system comprises a central data repository for data regarding the status of each of the remotely located, independent data storage systems; and
   a plurality of remote agent systems, wherein each remote agent system communicates with a respective one of the remotely located data storage systems, wherein each remote agent system collects metadata regarding the data stored at a respective remotely located data storage system, converts the collected data to a standardized format, and stores the collected data in the central data repository.

2. The data storage management system of claim 1, wherein each remote agent system comprises pattern recognition logic that can identify data patterns that precede fault conditions at a respective remotely located data storage system.

3. The data storage management system of claim 1, wherein each remote agent system consolidates the collected data prior to storing the collected data in the central data repository.

4. The data storage management system of claim 1, wherein a single remote agent system collects the metadata from its respective remotely located data storage system, and wherein each such single remote agent system filters collected data prior to communicating the collected data to the central monitoring system to reduce an amount of data communicated to the central monitoring system.

5. The data storage management system of claim 1, wherein each remote agent system comprises action logic that directs the remote agent system to perform one or more corrective actions at a respective remotely located data storage system in response to identifying a data pattern known to precede a fault condition.

6. The data storage management system of claim 1, wherein each remote agent system collects data and hardware information from a respective remotely located data storage system.

7. The data storage management system of claim 1, wherein each remote agent system comprises:
   one or more element information managers (EIMs), wherein each EIM is configured to communicate with a respective data source at a remotely located data storage network and convert data from the data source to the standardized format;
   one or more service information managers (SIMs), wherein each SIM is configured to communicate with EIMs associated with a common data application;
   one or more platform information manager (PIMs), wherein each PIM is configured to communicate with SIMs associated with a common data application platform; and
   an activity director that is configured to communicate with each EIM, SIM and PIM and to instruct each EIM, SIM and PIM as to what information to collect and store.

8. The data storage management system of claim 1, wherein each remotely located data storage system comprises one or more data storage devices.

9. The data storage management system of claim 8, wherein the one or more data storage devices comprise a plurality of heterogeneous data storage devices.

10. The data storage management system of claim 1, wherein the central monitoring system is configured to communicate corrective action information to each respective remote agent system and wherein each remote agent system is configured to implement the corrective action in response thereto.

11. The data storage management system of claim 1, wherein the central monitoring system is configured to communicate corrective action information to a third party for implementation.

12. The data storage management system of claim 1, wherein the central monitoring system is configured to analyze information from each remote agent system and identify patterns known to precede data storage problems at a respective remotely located data storage system.

13. The data storage management system of claim 1, further comprising a plurality of customer portals, each customer portal associated with a respective one of the remotely located data storage systems and with the central monitoring system, wherein each customer portal provides user access to information about a respective one of the remotely located data storage systems.

14. The data storage management system of claim 13, wherein each customer portal allows user control and configuration of a remotely located data storage system.

15. A data storage management system for managing a plurality of remotely located, independent data storage systems, comprising:
   a central monitoring system located at a geographical location different from a geographical location of each respective remotely located, independent data storage system, wherein the central monitoring system comprises a central data repository for data regarding the status of each of the remotely located, independent data storage systems; and
   a plurality of remote agent systems, wherein each remote agent system communicates with a respective one of the remotely located data storage systems, wherein each remote agent system collects metadata regarding the data stored at a respective remotely located data storage system, converts the collected data to a standardized format, and stores the collected data in the central data repository, wherein each remote agent system comprises pattern recognition logic that can identify data patterns that precede fault conditions at a respective remotely located data storage system, and wherein each remote agent system comprises action logic that directs the remote agent system to perform one or more corrective actions at a respective remotely located data storage system in response to identifying a data pattern known to precede a fault condition.

16. The data storage management system of claim 15, wherein a single remote agent system collects the metadata from its respective remotely located data storage system, and wherein each such single remote agent system consolidates the collected data prior to storing the collected data in the central data repository.

17. The data storage management system of claim 15, wherein each remote agent system filters collected data prior to communicating the collected data to the central monitoring system to reduce an amount of data communicated to the central monitoring system.

18. The data storage management system of claim 15, wherein each remote agent system collects data and hardware information from a respective remotely located data storage system.

19. The data storage management system of claim 15, wherein each remote agent system comprises:
   one or more element information managers (EIMs), wherein each EIM is configured to communicate with a respective data source at a remotely located data storage network and convert data from the data source to the standardized format;
   one or more service information managers (SIMs), wherein each SIM is configured to communicate with EIMs associated with a common data application;
   one or more platform information manager (PIMs), wherein each PIM is configured to communicate with SIMs associated with a common data application platform; and
   an activity director that is configured to communicate with each EIM, SIM and PIM and to instruct each EIM, SIM and PIM as to what information to collect and store.

20. The data storage management system of claim 15, wherein each remotely located data storage system comprises one or more data storage devices.

21. The data storage management system of claim 20, wherein the one or more data storage devices comprise a plurality of heterogeneous data storage devices.

22. The data storage management system of claim 15, wherein the central monitoring system is configured to communicate corrective action information to each respective remote agent system and wherein each remote agent system is configured to implement the corrective action in response thereto.

23. The data storage management system of claim 15, wherein the central monitoring system is configured to communicate corrective action information to a third party for implementation.

24. The data storage management system of claim 15, wherein the central monitoring system is configured to analyze information from each remote agent system and identify patterns known to precede data storage problems at a respective remotely located data storage system.

25. The data storage management system of claim 15, further comprising a plurality of customer portals, each customer portal associated with a respective one of the remotely located data storage systems and with the central monitoring system, wherein each customer portal provides user access to information about a respective one of the remotely located data storage systems.

26. The data storage management system of claim 25, wherein each customer portal allows user control and configuration of a remotely located data storage system.

27. A data storage management system for managing a plurality of remotely located, independent data storage systems, comprising:
   a central monitoring system located at a geographical location different from a geographical location of each respective remotely located, independent data storage system, wherein the central monitoring system comprises a central data repository for data regarding the status of each of the remotely located, independent data storage systems;
   a plurality of remote agent systems, wherein each remote agent system communicates with a respective one of the remotely located data storage systems, wherein each remote agent system collects metadata regarding the data stored at a respective remotely located data storage system, converts the collected data to a standardized format, and stores the collected data in the central data repository, wherein each remote agent system comprises:
      one or more element information managers (EIMs), wherein each EIM is configured to communicate with a respective data source at a remotely located data storage network and convert data from the data source to the standardized format;
      one or more service information managers (SIMs), wherein each SIM is configured to communicate with EIMs associated with a common data application;
      one or more platform information manager (PIMs), wherein each PIM is configured to communicate with SIMs associated with a common data application platform; and
      an activity director that is configured to communicate with each EIM, SIM and PIM and to instruct each EIM, SIM and PIM as to what information to collect and store; and
   a plurality of customer portals, each customer portal associated with a respective one of the remotely located data storage systems and with the central monitoring system, wherein each customer portal provides user access to information about a respective one of the remotely located data storage systems.

28. The data storage management system of claim 27, wherein a single remote agent system each remote agent system comprises pattern recognition logic that can identify data patterns that precede fault conditions at a respective remotely located data storage system.

29. The data storage management system of claim 27, wherein a single remote agent system collects the metadata from its respective remotely located data storage system, and wherein each such single remote agent system consolidates the collected data prior to storing the collected data in the central data repository.

30. The data storage management system of claim 27, wherein each remote agent system filters collected data prior to communicating the collected data to the central monitoring system to reduce an amount of data communicated to the central monitoring system.

31. The data storage management system of claim 27, wherein each remote agent system comprises action logic that directs the remote agent system to perform one or more corrective actions at a respective remotely located data storage system in response to identifying a data pattern known to precede a fault condition.

32. The data storage management system of claim 27, wherein each remote agent system collects data and hardware information from a respective remotely located data storage system.

33. The data storage management system of claim 27, wherein each remotely located data storage system comprises one or more data storage devices.

34. The data storage management system of claim 33, wherein the one or more data storage devices comprise a plurality of heterogeneous data storage devices.

35. The data storage management system of claim 27, wherein the central monitoring system is configured to communicate corrective action information to each respective remote agent system and wherein each remote agent system is configured to implement the corrective action in response thereto.

36. The data storage management system of claim 27, wherein the central monitoring system is configured to communicate corrective action information to a third party for implementation.

37. The data storage management system of claim 27, wherein the central monitoring system is configured to analyze information from each remote agent system and identify patterns known to precede data storage problems at a respective remotely located data storage system.

38. The data storage management system of claim 27, wherein each customer portal allows user control and configuration of a remotely located data storage system.

* * * * *